United States Patent [19]
Bloomquist

[11] 3,823,897
[45] July 16, 1974

[54] VERTICAL TAKE-OFF AND LANDING AIRCRAFT

[76] Inventor: Orville E. Bloomquist, 5516 Corvallis, North, Minneapolis, Minn. 55429

[22] Filed: May 30, 1972

[21] Appl. No.: 258,091

[52] U.S. Cl................ 244/12 R, 244/12 D, 244/52
[51] Int. Cl............................................. B64c 15/02
[58] Field of Search.... 244/12 R, 12 A, 12 B, 12 D, 244/23 R, 23 A, 23 B, 23 D, 52, 53 R, 55, 136; 60/232; 115/12 R; 114/151; 239/265.11, 265.19, 265.35, 265.37

[56] References Cited
UNITED STATES PATENTS

| | | | |
|---|---|---|---|
| 2,621,871 | 12/1952 | Robert | 244/52 |
| 2,870,978 | 1/1959 | Griffith et al. | 244/52 X |
| 2,967,684 | 1/1961 | Knecht | 244/136 |
| 3,003,455 | 10/1961 | Alexander et al. | 60/232 X |
| 3,147,591 | 9/1964 | McEwen | 60/232 X |
| 3,176,463 | 4/1965 | Bauger et al. | 244/12 R X |
| 3,187,708 | 6/1965 | Fox | 115/12 R |
| 3,309,041 | 3/1967 | Etchberger | 244/23 A |
| 3,380,660 | 4/1968 | Markowski | 239/265.19 |
| 3,675,612 | 7/1972 | Pfeiffer | 115/12 R |
| 3,698,192 | 10/1972 | Le Febvre | 60/232 |

FOREIGN PATENTS OR APPLICATIONS

| | | | |
|---|---|---|---|
| 893,942 | 4/1962 | Great Britain | 244/52 |

*Primary Examiner*—Trygve M. Blix
*Assistant Examiner*—Barry L. Kelmachter
*Attorney, Agent, or Firm*—Merchant, Gould, Smith & Edell

[57] ABSTRACT

A vertical take-off and landing aircraft (VTOL) having a single source of thrust acting through a plurality of reaction nozzles displaced from various axes of the aircraft to provide the requisite functions of lift, thrust and attitude control. The nozzles are infinitely variable to generate thrust in the desired direction, and each includes an extensible portion which is retracted for lift-off and extended for forward flight after a predetermined altitude has been reached. A bypass valve permits the thrust engine or engines to operate at full power during lift-off and landing. The aircraft includes a conventional control system for use at cruising speed.

3 Claims, 10 Drawing Figures

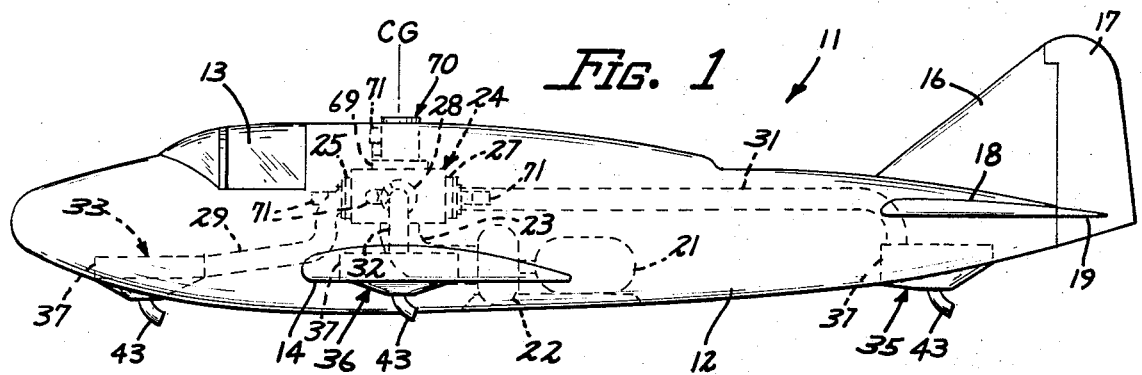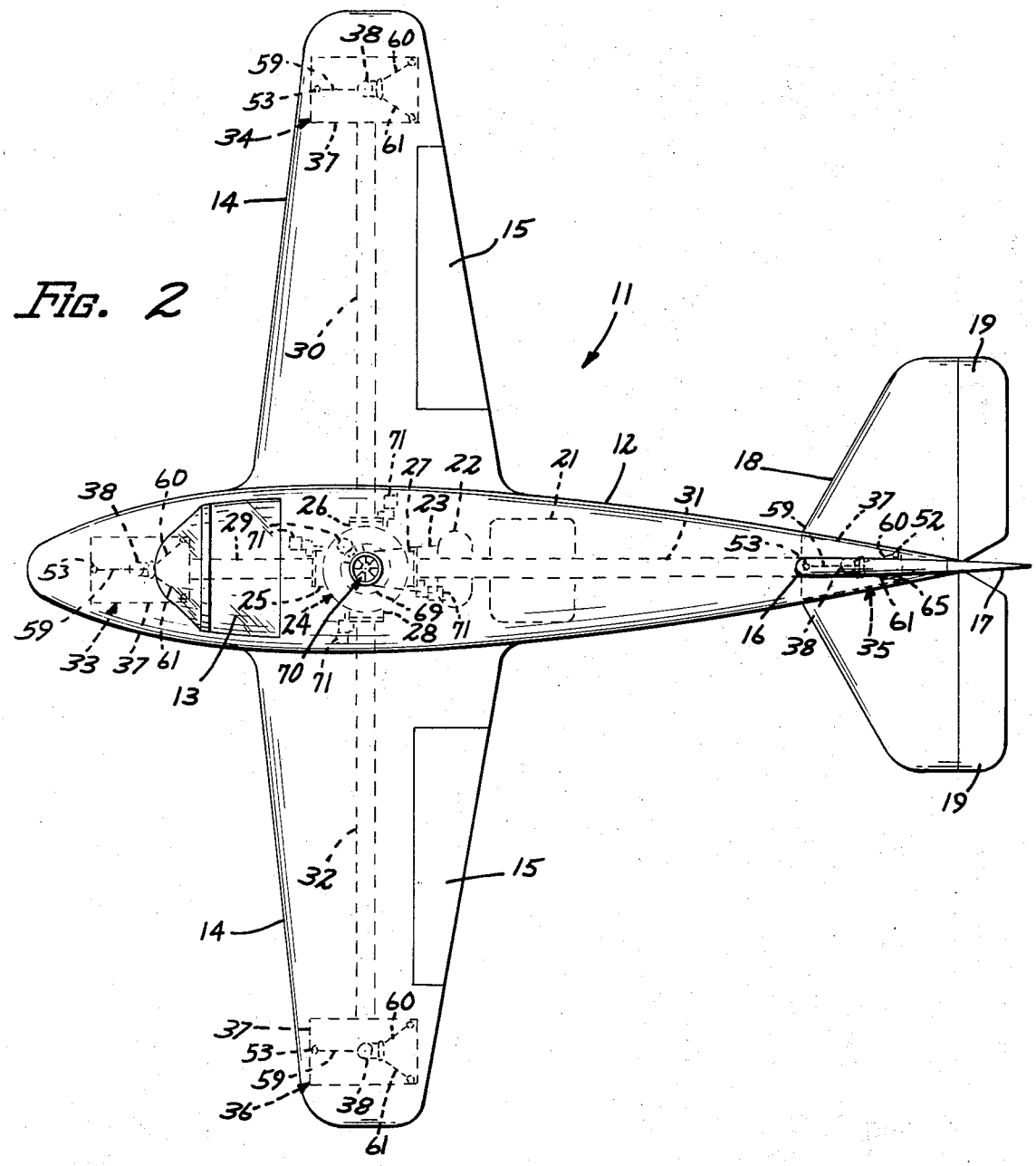

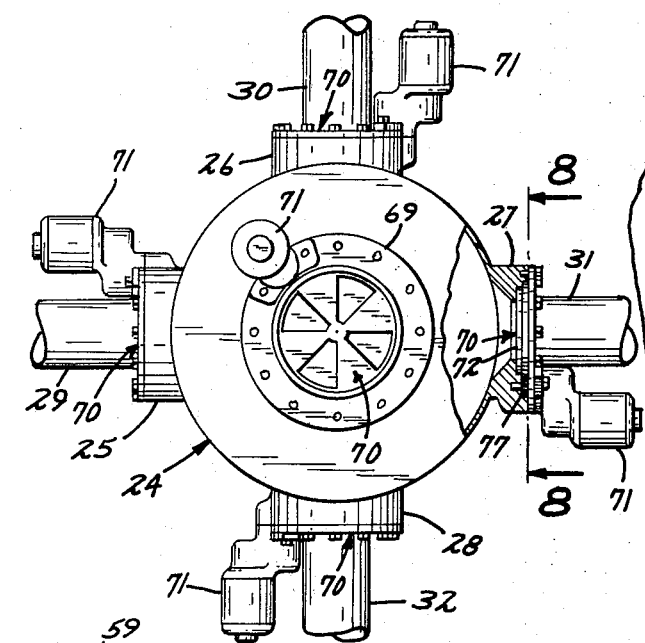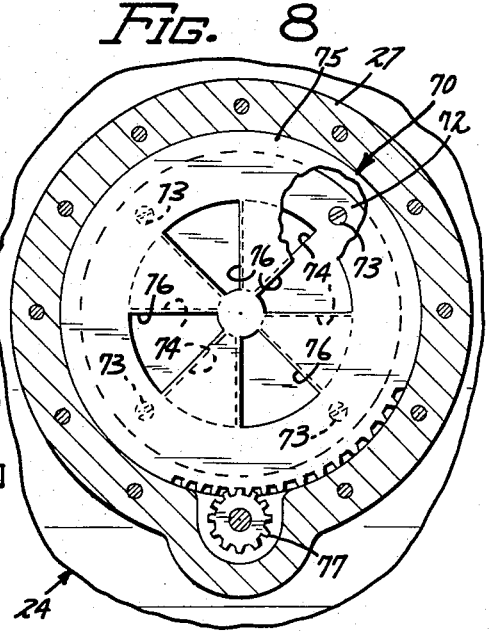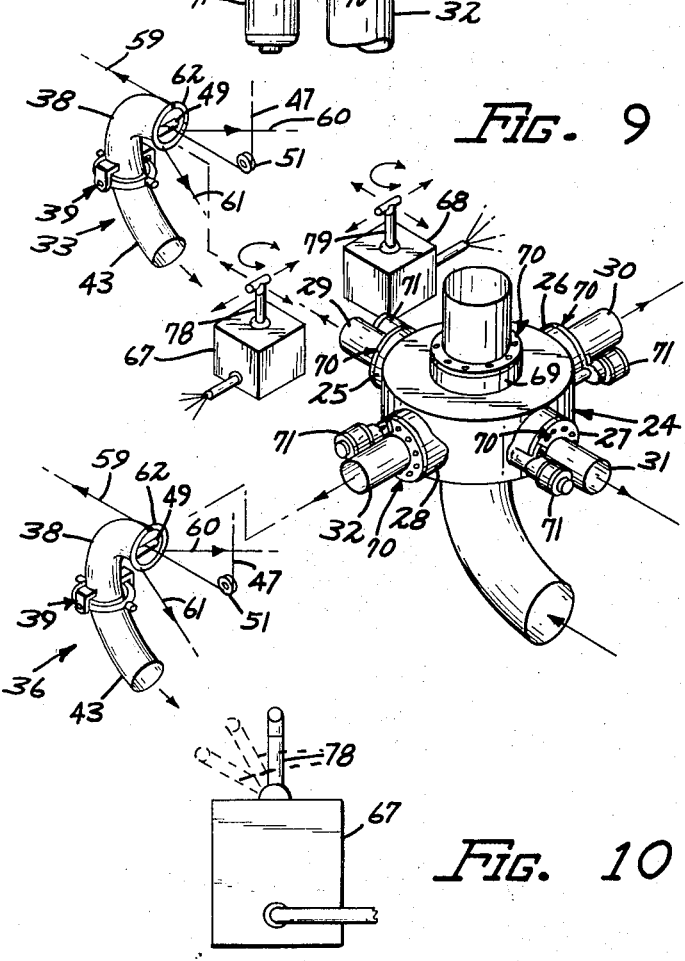

VERTICAL TAKE-OFF AND LANDING AIRCRAFT

The invention relates generally to vertical take-off and landing (VTOL) aircraft, and specifically contemplates such an aircraft having a single source of thrust and means for distributing the thrust to a plurality of points to provide the requisite functions of lift, thrust and attitude control.

Conventional VTOL aircraft presently employ a number of structural arrangements for effecting sufficient vertical thrust for take-off and landing and the directional control required during these operations. For example, one type of aircraft includes a plurality of separate thrust engines movable between vertical and horizontal thrust positions. Take-off is accomplished by tipping the engines to a vertical position, and thereafter moving them to a horizontal position for forward flight. In another design, the engine thrust is deflected vertically downward from the aircraft center of gravity, with part of the thrust drawn off into wing tip jets to provide attitude control at low forward speeds.

My invention is directed to a VTOL aircraft having a single thrust source (generated by one or more engines), the thrust force being ducted to a plurality of thrust nozzles displaced from various axes of the aircraft which are controllable to produce a variable degree of thrust in any direction and to effect proper attitude of the aircraft about roll, pitch and yaw axes.

Preferably, four such thrust nozzles are included, one on the underside of each wing tip and one under the aircraft nose and tail. Each nozzle comprises a base nozzle communicating directly with its associated duct and infinitely variable in all directions away from the directly downward position. The base nozzles are therefore capable of providing the necessary directional control of thrust during take-off and landing.

Each thrust nozzle further comprises an extensible nozzle which is disposed in a retracted position within the base nozzle during take-off and landing, and is extended to divert the thrust to a horizontally rearward direction for forward flight.

The aircraft includes means for controlling the thrust direction of the base nozzles, for extending and retracting the extensible nozzles and also for controlling the volume of gas or thrust distributed to each nozzle through the duct system. Also included is a bypass valve disposed essentially over the aircraft center of gravity and operable by the control system to bypass an appropriate amount of thrust away from the nozzles to achieve the necessary balance of forces during take-off and landing. This by-pass valve enables the thrust engine or engines to be operated at full power during both take-off and landing, which is inherently safer than proportioning the volume of downward thrust by controlling engine speed.

It will be appreciated that the inventive VTOL aircraft offers maximum utility by performing the functions of standard aircraft and the helicopter through its ability to take-off and land vertically as well as fly in a normal manner at speeds common to modern aircraft. The inventive VTOL aircraft also offers maximum simplicity by reason of its single source of thrust acting through the more easily controlled thrust nozzles. Greater safety is inherent in the inventive aircraft because it retains normal aircraft control surfaces for safe landing in an emergency. Further, changing from vertical to horizontal flight and vice versa is accomplished without having to change from one set of engines to another or without having to move entire thrust engines from vertical to horizontal positions and vice versa. Additional safety features arise from the signal thrust source, which may comprise one or more engines, which obviates unbalanced thrust that would otherwise occur when one of a pair or group of engines fails; and also by reason of the bypass flow system which enables the thrust engine or engines to be maintained at full power during take-off and landing. The use of the comparatively small thrust nozzles is also advantageous over bulky external lift engines, which give rise to aerodynamic drag and also add additional weight to the aircraft.

BRIEF DESCRIPTION OF THE DRAWINGS

FIG. 1 is a view in side elevation of a vertical take-off and landing aircraft embodying the inventive principle, portions thereof represented by phantom lines;

FIG. 2 is a top elevation of the VTOL aircraft with portions represented by phantom lines;

FIG. 7 is an enlarged view in top plan of a thrust source for the VTOL aircraft and a plurality of thrust control means therefor;

FIG. 8 is an enlarged sectional view of a thrust control means taken along the line 8—8 of FIG. 7;

FIG. 9 is a perspective schematic representation of the VTOL aircraft control system; and FIG. 10 is an enlarged view in side elevation of a manual control for the aircraft control system.

DESCRIPTION OF THE PREFERRED EMBODIMENT

Figure 3:
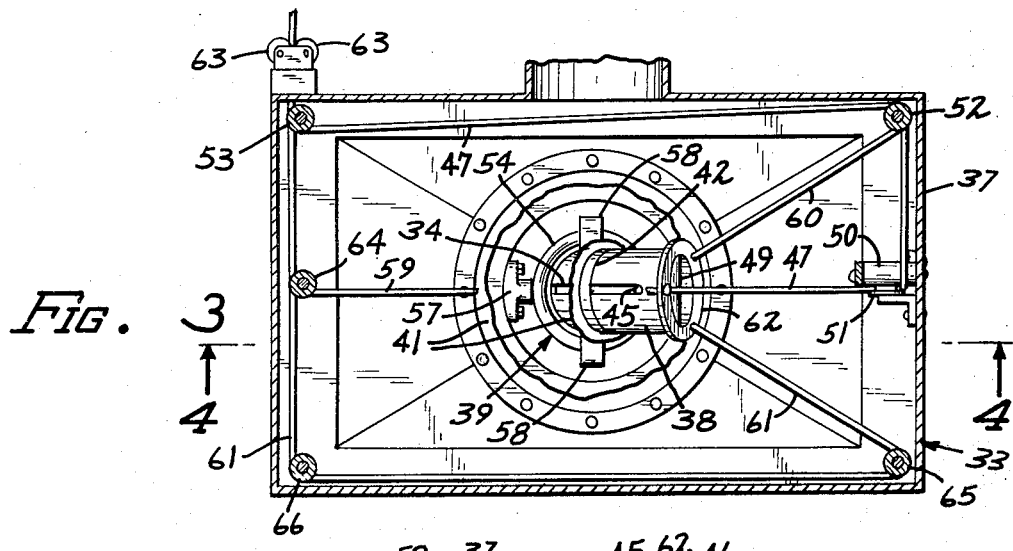
FIG. 3 is an enlarged fragmentary view of a thrust nozzle for the inventive VTOL aircraft and controls therefor, portions thereof broken away.
Figure 4:
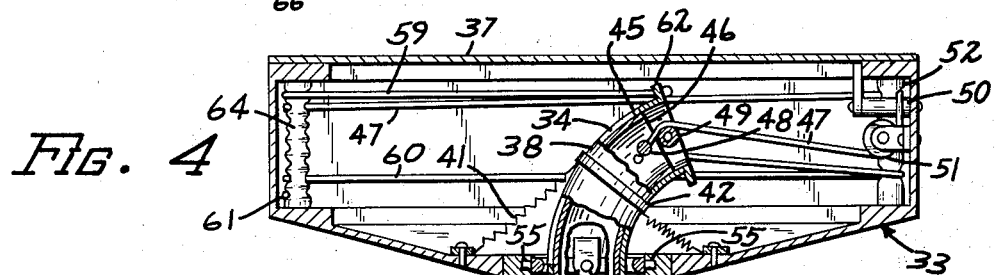
FIG. 4 is a sectional view of the thrust nozzle in a first operative state, taken along the line 4—4 of FIG. 3.
Figure 5:
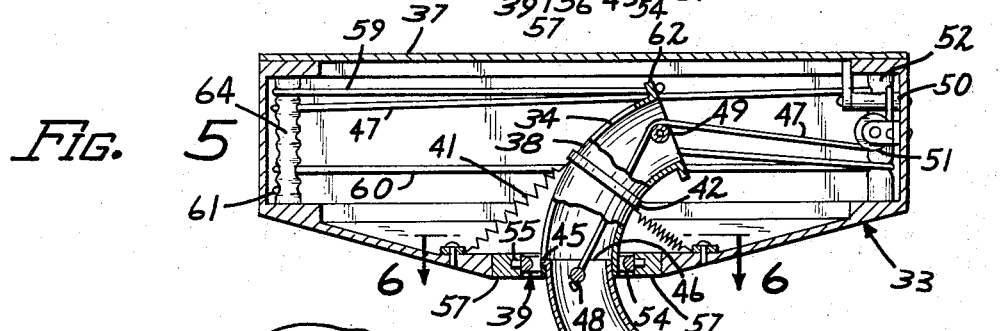
FIG. 5 is a sectional view of FIG. 4 with the thrust nozzle in a second operative state.

With initial reference to FIGS. 1 and 2, a vertical take-off and landing aircraft embodying the inventive principle is represented generally by the numeral 11. Except as described below, aircraft 11 is conventional in nature, including a fuselage 12, a cockpit 13, wings 14 with ailerons 15, a vertical tail member or fin 16 with rudder 17 and a horizonal tail member or stabilizer 18 having elevators 19. Ailerons 15, rudders 17 and elevators 19 are used in the conventional manner to control attitude of aircraft 11; i.e., turning movement about a vertical axis (yaw), up and down movement about a transerse horizontal axis (pitch) and rolling movement about a longitudinal axis of the fuselage 12 (roll). The center of gravity of aircraft 11 lies on the vertical axis designated CG in FIG. 1.

Aircraft 11 is powered by an engine 21 which drives a compressor 22. The high pressure output of compressor 22 is delivered through a duct 23 to a distributive unit or common thrust source 24 which acts essentially as a plenum. Distributive unit 24 has four radially disposed outlets 25–28 which respectively distribute compressed gas through ducts 29–32 to remote thrust chambers 33–36. As best shown in FIG. 2, remote thrust chamber 33 is disposed in the nose of aircraft 11 on the longitudinal axis, remote thrust chambers 34 and 36 are disposed at the aircraft wing tips on the transverse axis, and remote thrust chamber 35 is disposed in the aircraft tail, also on the horizontal axis.

With specific reference to FIGS. 3–6, each of the remote thrust chambers 33–36 is essentially the same, and chamber 33 is described in detail for exemplary purposes. Thrust chamber 33 consists of a sealed housing 37 in which a base nozzle 38 is mounted by means of a universal 39. An essentially conical shaped flexible bellows 41 and sealably affixed to the inner bottom surface of housing 37 and to a collar 42 carried by base nozzle 38 to maintain the chamber sealed.

Base nozzle 38 is tubular in cross section and arcuately formed over its length as shown. With specific reference to FIG. 4, an extension nozzle 43 conforming in shape to base nozzle 38 but slightly smaller in cross sectional size is slidably disposed therein. For alignment purposes, base nozzle 38 has an elongated slot 34 extending a predetermined distance along its top surface, and a projection 45 affixed to the outer surface of extension nozzle 43 slides alignably therein. Extension nozzle 43 is shown in its retracted position in FIG. 4 and in an extended position in FIG. 5. Extension of nozzle 43 is effected by the high pressure within remote chamber 33 acting against the exposed annular end section 46. Retraction is accomplished by a control cable 47 secured to a transverse member 48 disposed within extension nozzle 43 and passing over a pulley 49 mounting on the side of base nozzle 38, a pulley 51 mounted on the rear inner surface of housing 37, a horizontal roller 50, a first vertical corner roller 52 and a second corner roller 53. Control cable 47 leaves remote chamber through a double roller 63.

Figure 6:
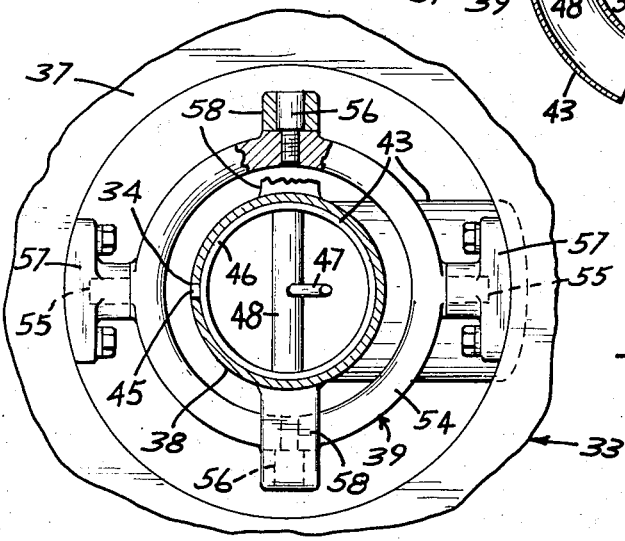
FIG. 6 is an enlarged sectional view of the thrust nozzle taken along the line 6—6 of FIG. 4, portions thereof being further broken away and shown in section.

With reference to FIG. 6, universal hinge 39 consists of an annular ring 54 having a first pair of opposed pivot pins 55 projecting outwardly therefrom and a second pair of opposed pivot pins 56 projecting outwardly in a transverse direction. Pivot pins 55 are journaled in bearing members 57 mounted on the bottom wall of housing 37, thus permitting side-to-side movement of the annular ring 54 relative to housing 37. Affixed to opposite sides of the base nozzle 38 are angular arm members 58 which are apertured to rotatably cooperate with the pivot pins 56. Thus, as described, universal hinge 39 permits infinitely variable angular movement of base nozzle 38 and extension nozzle 43 up to approximately 45 degrees in all directions away from the directly downward position of base nozzle 38.

The angular position of the nozzles is determined by control cables 59-61 which are affixed at equidistantly spaced intervals on an annular flange 62 at the top of base nozzle 38 and extend in different directions therefrom. Control cable 59 is affixed to annular flange 62 at its top, passing around a roller 64 before leaving remote thrust chamber 33 through the double roller 63. Control cable 60 extends from annular flange 62 around corner roller 52, corner roller 53 and out of remote thrust chamber 33 through the double roller 63. Similarly, control cable 61 extends from annular flange 62 around a first corner roller 65, a second corner roller 66 and out of remote thrust chamber 33 through double roller 63.

It will thus be appreciated that each of the remote thrust chambers 33-36 includes four control cables corresponding to those designated 47 and 59-61 which are selectively pullable to extend and retract extension nozzle 43, and to govern the angular position of base and extension nozzles 38 and 43.

With reference to FIG. 9, each of the remote thrust chambers 34-36 has corresponding control cables which, by reason of their common connection, carry the same reference numerals 47 and 59-61 as those related to remote thrust chamber 33. These several cables commonly merge in a first manual control unit 67 and a second manual control unit 68. It will be appreciated that appropriate servomechanisms may be utilized between the control units 67 and 68 and each of the remote thrust chambers 33-36 to accomplish the desired control as set forth below.

With additional reference to FIGS. 7 and 8, distributive unit 34 includes a fifth upwardly directed outlet 69 disposed over the center of gravity CG which serves as a bypass to the outlets 25-28. The magnitude of thrust delivered from these outlets is controlled by identical thrust control valves. FIG. 8 is an enlarged sectional representation of the thrust control valve 70 which controls outlet 27, the valve position being determined by a hydraulic motor 71 or its equivalent. Valve 70 comprises a stationary circular plate 72 which is disposed in an annular recess formed in outlet 27 and secured thereto by a plurality of screws 73. Circular plate 72 has four equidistantly spaced segment openings 74 formed therein to permit compressed gas to flow therethrough. Thrust control valve 70 further comprises a rotatable plate 75 having four equidistantly spaced segmented openings 76 which are registrable with the openings 74 to permit various degrees of openings therebetween. Plate 75 is geared along its peripheral edge and reversibly driven by hydraulic motor 71 through a gear wheel 77.

Referring again to FIG. 9, manual control unit 67 has a control handle 78, and a similar handle 79 is provided for control unit 68. As indicated by the arrows associated therewith, each of the control handles 78, 79 is capable of tipping movement forwardly, rearwardly and to either side, and is further capable of rotation in either direction about a vertical axis. One of the primary functions of the manual control unit 67 is directional control of the nozzles within remote thrust chambers 33-36. By tipping the control handle 78 in any direction, the control unit 67, acting through the control cables 59-61, causes the base nozzles 38 to simultaneously move to an opposed position to cause the aircraft 11 to move in the direction towards which the handle 78 is pointed. FIG. 10 shows handle 78 in various forward positions, the middle of which is a detent position. Movement of the handle 78 in the forward direction up to the detent position controls directional movement of base nozzles 38 as described; and forward movement beyond this detent position causes the nozzles 43 to extend by releasing tension on control cable 47 and allowing the thrust power to force the nozzles 43 outward, as described above. Movement of the handle 78 back to the detent position causes the control cable 47 to retract extension nozzles 43 into their normal position with base nozzles 38.

Yaw or rudder control is accomplished by rotating the handle 78 about its vertical axis in either direction, which causes the base nozzles 38 of thrust control units 33 and 35 to move laterally in opposite directions and thereby move aircraft 11 about the vertical yaw axis.

The primary function of manual control unit 68 is to control the magnitude of thrust delivered from outlets 25-28 and 69 by governing the position of thrust control valves 70 through actuation of reversible hydraulic motors 71. Generally speaking, to maintain aircraft 11 in its horizontal position, handle 79 is tipped in a given direction and the downward thrust corresponding to that direction decreases while at the same time downward thrust from the opposite direction increases. As a specific example, tipping of handle 79 laterally toward remote thrust chamber 34 would cause its thrust control valve 70 to close to the degree handle 79 is tipped; and at the same time, the thrust control valve 70 for remote thrust chamber 36 would be inversely controlled; i.e., opened a commensurate degree. It will be appreciated that tipping handle 79 in a direction lying between remote control chambers will respectively decrease the thrust to those control chambers in accordance with the direction of handle movement, and effect a corresponding increase in thrust to the opposed remote control chambers. In the absence of a tipping force, handle 79 is constructed and arranged to center itself so that the thrust to remote thrust chambers 33-36 is normally equal.

Rotation of the handle 79 about its vertical axis controls the reversible hydraulic motor 71 and thrust control valve 70 for bypass outlet 69, clockwise rotation of the handle 79 causing valve 70 to open. A detent is also provided to retain handle 79 in its central position about the vertical axis to prevent accidental opening of the bypass thrust control valve 70.

In operation, with aircraft 11 on the ground, engine 21 is started to drive compressor 22 and thereby generate thrust in the form of compressed gas through the ducts 29-32 to remote thrust chambers 33-36. With engine 21 in an idling state, handle 79 is rotated clockwise about its vertical axis to open thrust control valve 70 for bypass outlet 69, at which point engine 21 is brought to full power. Handle 78 is centered to point all base nozzles 38 directly downward. Handle 79 is then rotated counterclockwise to close the thrust control valve 74 bypass outlet 69, thereby diverting sufficient thrust to the remote thrust chambers 33-36 to take-off. Tipping of the control handle 78 in an appropriate direction, as described above, enables the pilot to compensate for wind direction and velocity and thereby maintain aircraft 11 in a horizontal position over the point of take-off. At a suitable altitude, handle 78 is rotated about its vertical axis to turn aircraft 11 in the desired direction of forward movement. After the desired directional position has been reached, control handle 78 is gradually tipped forward to cause forward movement of the aircraft 11. Such forward movement is, of course, accompanied by lifting forces on the wings 14 and stabilizer 18 by reason of the aerodynamic control surfaces. As base nozzles 38 attain their rearwardmost angular position corresponding to the intermediate detent position of handle 78 (FIG. 10), handle 78 is pushed forward beyond the detent to effect extension of the nozzles 43 from the base nozzles 38, thus providing full force thrust to the aircraft 11. At cruising speed, aircraft 11 is conventionally controlled through the use of ailerons 15, rudders 17 and elevators 19.

To descend, handle 78 is brought rearwardly to the intermediate detent position, which causes extension nozzles 43 to retract within base nozzles 38. Handle 78 is then brought gradually to its rearmost position to slow the aircraft 11 and is them moved gradually forward as the aircraft 11 comes to a stop so that the base nozzles 38 are pointing directly downward with the aircraft over its intended point of landing. During slowdown and descent, the aircraft 11 is kept level by tipping the control handle 79 as needed, and it is kept over the intended point of landing by tipping the control handle 78. Descent is effected by rotation of handle 79 about its vertical axis to open the thrust control valve 70 of bypass outlet 69.

It will be appreciated from the foregoing that the inventive concept may be used in conjunction with multiple engines and/or compressors to provide a central source of thrust to the distributive unit, or that other engines such as jet or propellor driven types may be added to provide horizontal thrust in addition to or in place of engine 21. It will also be apparent that the distributive thrust system may be used on vehicles other than aircraft, such as a boat hull to raise the boat out of the water and propel it a short distance above the water in the manner of hydrofoil boats.

I claim:

1. In combination:
   a. an aircraft constructed for vertical take-off and landing and having a centralized source of thrust power capable of lifting the aircraft vertically from a take-off position;
   b. means for conducting substantially all of said thrust power to a plurality of remote points on said aircraft for delivery therefrom, said remote points disposed to cooperably effect a balanced take-off of the aircraft from said take-off position;
   c. outlet means associated with each of said remote points and moveable to control the directional delivery of the portion of thrust power delivered to each of said outlet means;
   d. means for controlling movement of said outlet means;
   e. means for controlling the magnitude of thrust power delivered from said outlet means;
   f. an upwardly directed bypass outlet disposed over the center of gravity of the aircraft and communicating with the centralized thrust power source to divert thrust power from said plurality of outlet means; and
   g. means for controlling the magnitude of thrust delivered from said bypass outlet.

2. The combination defined by claim 1, wherein the thrust controlling means for the bypass outlet comprises:
   a. a thrust control valve associated with said bypass outlet for varying the magnitude of thrust power delivered thereto;
   b. and centralized manually operable control unit means for opening and closing the thrust control valve.

3. In combination:
   a. a vertical take-off and landing aircraft having a longitudinal axis and a predetermined center of gravity;
   b. a source of thrust power centrally disposed in the aircraft and capable of lifting the aircraft vertically from a take-off position;
   c. a plurality of essentially downwardly directed thrust nozzles operatively mounted on the aircraft, at least two of said nozzles being disposed on opposite sides of the longitudinal axis and at least one nozzle disposed essentially on said longitudinal axis;
d. said nozzles being angularly movable to any direction from said downward position;
e. means for conducting substantially all of said thrust power from said source of thrust to said thrust nozzles;
f. an extension nozzle for each of said thrust nozzles and extensible from a retracted position therein, said extension nozzles being constructed and arranged to deliver thrust power essentially rearwardly of said aircraft in the extended position;
g. an upwardly directed bypass outlet disposed over the center of gravity and communicating with the centralized thrust source to divert thrust power from said plurality of thrust nozzles;
h. thrust control valve means associated with each of said thrust nozzles and said bypass outlet for controlling the magnitude of thrust power delivered thereto;
i. and manually operable control unit means
  1. for controlling the directional position of said thrust nozzles;
  2. for extending and retracting said extension nozzles;
  3. and for selectively opening and closing said thrust control valve means.

* * * * *